A. LOWY.
BAG HANDLE.
APPLICATION FILED AUG. 14, 1916.
Reissued Dec. 5, 1916. 14,225.
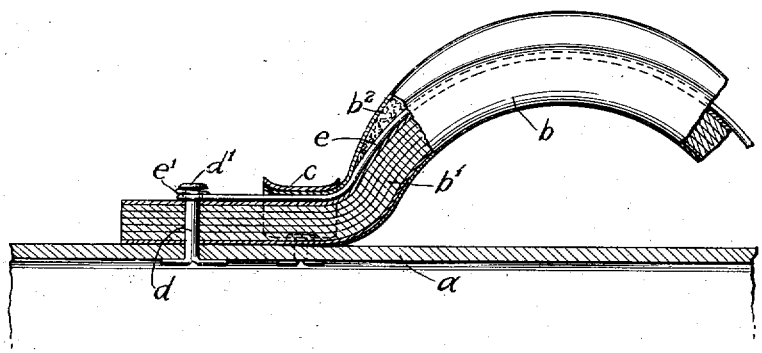
INVENTOR
Adolph Lowy
BY
Isaac B. Owens
ATTORNEY
THE MORRIS PETERS CO., WASHINGTON, D. C.

UNITED STATES PATENT OFFICE.

ADOLPH LOWY, OF NEW YORK, N. Y.

BAG-HANDLE.

14,225. Specification of Reissued Letters Patent. Reissued Dec. 5, 1916.

Original No. 1,171,528, dated February 15, 1916, Serial No. 55,366, filed October 12, 1915. Application for reissue filed August 14, 1916. Serial No. 114,918.

*To all whom it may concern:*

Be it known that I, ADOLPH LOWY, a citizen of the United States, and a resident of the borough of Manhattan, city, county, and State of New York, have invented certain new and useful Improvements in Bag-Handles, of which the following is a description in such full, clear, and exact terms as will enable any person skilled in the art to which it pertains to make and use the same.

My invention relates to an improved handle, for bags, suit cases and the like and is particularly adapted for use in connection with the bag handles constructed of the less durable materials ordinarily employed in the manufacture preferably of cheap-grade goods. In the manufacture of this class of bags it has been found that the handle is the first part to break away and indeed the life of the bag is marked by the life of the handle.

My invention seeks to reinforce the handle without, however, giving that part any form or appearance other than that customary and usual in the standard bag structure.

To this end my invention consists in the special features of construction which will be fully set forth hereinafter and particularly pointed out in the claims.

The accompanying drawing is a sectional elevation of the invention.

*a* represents the part of the bag, suit-case or other article to which the handle is attached, being usually the top of the suit-case.

The handle *b* is constructed of the usual or any desired material but generally and preferably of the laminated main part $b'$ and the leather covered padding $b^2$, the main part $b'$ giving the strength to the handle and the padding $b^2$ making a stronger and easier grip.

*c* represents in section the usual keeper, one at each end of the handle and fastened through the wall of the bag or suit-case. The usual enlarged ends of the handle lie flat on the suit-case and are further secured to the bag by a rivet *d* driven through the laminated parts $b'$ and through the wall of the bag *a*.

According to my invention I employ a wire ligament *e* which is run through the handle from end to end on top of the laminated section $b'$ and under the padding $b^2$. This ligament *e* is concealed in the handle and covered and protected by the padding thereof and its ends projected out from under the keepers *c* and are formed into eyes $e'$ which pass around the shanks of the rivets *d* and are covered and concealed by the heads $d'$ of said rivets.

From the aforegoing it will be seen that by means of my invention the handle proper is heavily and completely reinforced by the practically unbreakable steel or other ligament *e*, which ligament is concealed in the handle and the ends of which are anchored securely to the body of the bag through the middle, by the same rivets which fasten the handle laminations $b'$ in place. This allows the handle to be constructed of cheap materials, particularly the materials forming the laminations $b'$ and yet endows the handle with all of the strength or even greater strength than that characteristic of the handles formed by the highest grade grain leather.

What I claim is:—

1. A bag having a handle, a metallic ligament running through and concealed in the handle, a keeper fastened to the bag through which the handle and ligament pass and a rivet passing through the end of the handle and into the bag around which rivet and under the head thereof, the end of said metallic ligament is turned and by which it is anchored in place.

2. A suit case having a handle with its enlarged ends lying flat on the surface thereof, a metal ligament running through and concealed in the handle, keepers fastened to the bag through which the ends of the handle and ligament pass and rivets passing through the enlarged ends of the handle perpendicularly to the said surface of the suit case around which rivets and under the heads of which the ends of said metallic ligament are turned and by which they are anchored in place.

ADOLPH LOWY.

Witnesses:
PATRICK A. BOLGER,
ETHEL S. HUGHES.

Copies of this patent may be obtained for five cents each, by addressing the "Commissioner of Patents, Washington, D. C."